June 7, 1938.  C. T. WALTER  2,119,729
PRINTING NATURAL SAUSAGE CASINGS
Filed May 27, 1935
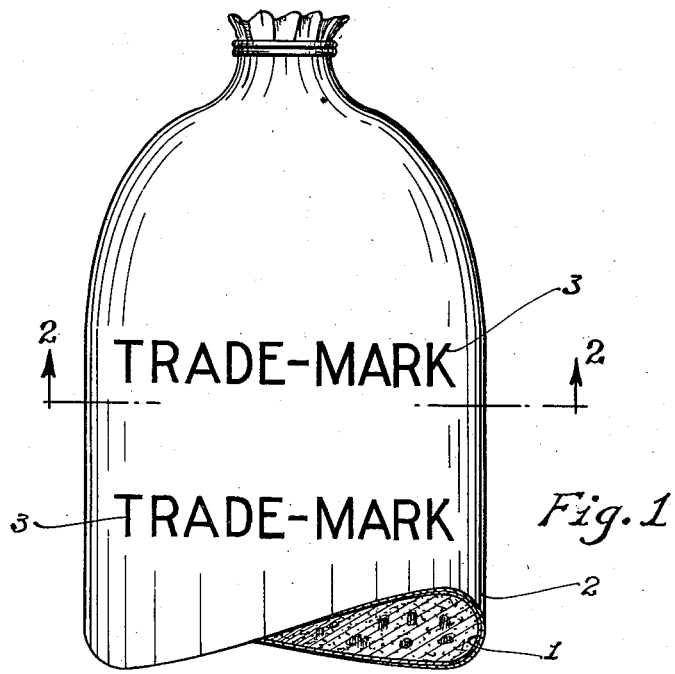
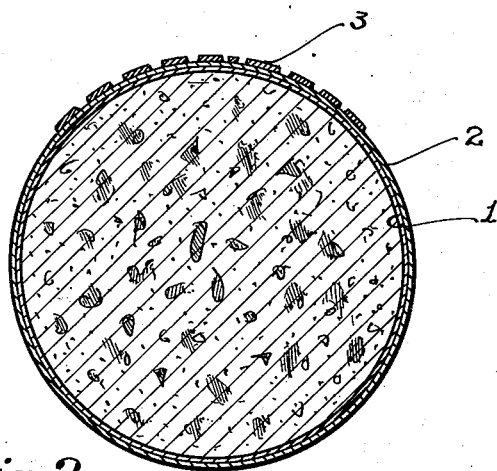
Charles T. Walter
INVENTOR
WITNESS —

Patented June 7, 1938

2,119,729

UNITED STATES PATENT OFFICE 2,119,729

PRINTING NATURAL SAUSAGE CASINGS

Charles T. Walter, Chicago, Ill., assignor to Industrial Patents Corporation, Chicago, Ill., a corporation of Delaware Application May 27, 1935, Serial No. 23,665

13 Claims. (Cl. 99—109)

This invention relates to a method of printing natural sausage casings prepared from animal intestines and to the product thereof.

One of the objects of the invention is to provide a method for printing natural casings prepared from animal intestines bearing a printed mark or character.

Another object of the invention is to provide a preprinted natural animal casing.

Other objects of the invention will be apparent from the description and claims which follow.

Referring now to the drawing:

Figure 1 is a perspective view of a section of sausage with a casing treated in accordance with the present invention.

Figure 2 is a cross-sectional view on the line 2—2 of Figure 1.

It will be seen that the finished casing comprises animal membrane 1, cellulose film 2 and characters 3, the characters being printed on the cellulose film.

I have found that although certain types of animal casings may be printed in accordance with the teachings of my copending application entitled Treatment of casings, Serial No. 23,664, filed May 27, 1935, that certain casings such as weasands have a tendency to resist adherence of the ink.

The present invention is directed to a method of treating such casings in a manner which will assure adherence of the ink. In carrying out the method of the present invention I employ an ink which is waterproof, smokeproof and opaque. An example of an ink composition which is satisfactory is as follows, percentages being indicated by weight:

| | Percent |
|---|---|
| Pigment (such as an oxide of titanium) | 60–65 |
| Fluid medium or menstruum | 40–35 |

The fluid medium, or fluid vehicle, which carries the pigments, preferably comprises:

| | Percent |
|---|---|
| Waterproof spar varnish | 10–20 |
| Unsaponifiable waxy or greasy matter (for example 5 to 7 parts of paraffin and 100 parts petroleum jelly) | 5–10 |
| Lithographic linseed oils (litho-oils) | 70–85 |

Any suitable spar varnish may be employed. Preferably a varnish known in the varnish trade as "long oil" China-wood varnish is used. For example, the varnish may comprise 25 gallons of a drying oil, preferably China-wood oil, to 100 pounds of a natural or synthetic resin, or a combination of such resins. Thus, ester gum, other natural gums, or synthetic gums, such as potentially reactive phenol-condensation products may be employed.

A suitable waterproof spar varnish may be used in accordance with the specifications of the Bureau of Standards, entitled "United States Government Master Specification for Varnish, Spar Water Resisting", Federal Specifications Board No. 18b.

Any suitable substitute may be employed for the paraffin and petroleum jelly mixture of the waxy character set forth above. Where a mixture of paraffin and petroleum jelly is employed preferably they are in the proportion of 5 to 7 parts paraffin to 100 parts of petroleum jelly.

The lithographic linseed oil employed is one which has been changed in consistency by the application of heat. A suitable range of consistencies is from 0000 to No. 8, as designated in the trade pertaining to litho-oils.

The casing is prepared for printing by first drying or semidrying. The dried or semidried casing is then coated with a thin film of cellulose viscose which film is then regenerated into substantially pure cellulose by immersion in a suitable regenerating bath such as a solution of sodium sulphate slightly acidified with sulphuric acid. Upon regeneration the film becomes clear, transparent and glossy and adheres firmly to the surface of the casing which may now be washed and dried in the usual manner. In the dried condition, the cellulose film, which is quite thin, is firmly bonded to the casing.

I prefer to treat the coated casing with a hygroscopic agent such as glycerin to render it pliable. The casing may then be printed with any of the inks ordinarily used for printing artificial sausage casings, which ink is then dried or hardened. An example of the ink which may be used is that which already has been discussed.

In practice I prepare weasands for drying in the casing room. The weasands are then inflated with air and tied at both ends. The wet inflated weasands are then returned to a drying room where they become thoroughly dry after a number of hours. After the inflated weasands have become partially dried so that the outside surface is free from excess moisture the weasands are coated with a thin layer of cellulose viscose which may be applied in any appropriate manner, as brushing, spraying or dipping. It is preferable to have the cellulose viscose solution diluted. A commercial cellulose viscose solution diluted with about three parts of water is found to be satisfactory and may be handled with a spray gun or a dip tank. After being coated with the cellulose viscose solution the inflated weasands are submerged in a suitable regenerating bath for a few minutes, removed and washed. After this treatment the weasands are suitable for printing in any desired manner.

I have found that in the case of inks that do not ordinarily give good results due to failure to stand rubbing when wetted in the ordinary sausage stuffing room handling, good results may be obtained by wetting only the inside of a dried pre-coated printed weasand. This may be done by placing an open end of an inflated weasand over a perforated pipe and spraying water over the inner surface. This treatment softens the casing sufficiently to permit stuffing without affecting the printing on the outer surface.

In the claims which follow, the term "natural casings" will be understood to be limited to casings prepared from animal membranes such as intestines.

I claim:

1. The method of treating natural casings which comprises coating the outer surface with cellulose viscose and regenerating substantially pure cellulose from the cellulose viscose.

2. The method of treating natural casings which comprises coating the outer surface with cellulose viscose, regenerating substantially pure cellulose from the cellulose viscose and printing thereon.

3. The method of treating natural casings which comprises coating the outer surface with cellulose viscose, regenerating substantially pure cellulose from the cellulose viscose and printing thereon with a smokeproof, moistureproof opaque ink.

4. The method of treating natural casings which comprises coating the outer surface with cellulose viscose, regenerating substantially pure cellulose from the cellulose viscose, treating the coated casing with glycerin and printing thereon.

5. The method of treating natural casings which comprises coating the outer surface with cellulose viscose, regenerating substantially pure cellulose from the cellulose viscose, treating the coated casing with glycerin and printing thereon with a smokeproof, moistureproof opaque ink.

6. The method of preparing preprinted sausages in animal casings which comprises coating the outer surface of casings with cellulose viscose, regenerating substantially pure cellulose from the cellulose viscose, printing thereon, drying the preprinted casing, moistening the inner surface of the casing and stuffing.

7. The method of preparing preprinted sausages in animal casings which comprises drying the casings, coating the outer surface with cellulose viscose, regenerating substantially pure cellulose from the cellulose viscose, printing thereon, drying the preprinted casing, moistening the inner surface of the casing and stuffing.

8. A sausage casing comprising a portion of animal intestine with a film of cellulose on the outer surface.

9. A sausage casing comprising a portion of animal intestine with a film of cellulose on the outer surface bearing printed characters.

10. A sausage casing comprising a portion of animal intestine with a film of cellulose on the outer surface bearing printed characters formed with smokeproof, moistureproof opaque ink.

11. A sausage product provided with a casing comprising a portion of animal intestine with a film of cellulose on the outer surface.

12. A sausage product provided with a casing comprising a portion of animal intestine with a film of cellulose on the outer surface bearing printed characters.

13. A sausage product provided with a casing comprising a portion of animal intestine with a film of cellulose on the outer surface bearing printed characters formed with smokeproof, moistureproof opaque ink.

CHARLES T. WALTER.